United States Patent
Yokotani et al.

(10) Patent No.: US 8,934,216 B2
(45) Date of Patent: Jan. 13, 2015

(54) COMPOSITION FOR FORMING HIGH DIELECTRIC FILM FOR FILM CAPACITOR

(75) Inventors: Kouji Yokotani, Settsu (JP); Miharu Ota, Settsu (JP); Mayuko Tatemichi, Settsu (JP); Nobuyuki Komatsu, Settsu (JP); Eri Mukai, Settsu (JP); Meiten Koh, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 522 days.

(21) Appl. No.: 13/141,274

(22) PCT Filed: Dec. 21, 2009

(86) PCT No.: PCT/JP2009/071236
§ 371 (c)(1),
(2), (4) Date: Jun. 21, 2011

(87) PCT Pub. No.: WO2010/074026
PCT Pub. Date: Jul. 1, 2010

(65) Prior Publication Data
US 2011/0249374 A1    Oct. 13, 2011

(30) Foreign Application Priority Data
Dec. 22, 2008    (JP) .................................. 2008-326104

(51) Int. Cl.
*H01G 4/08* (2006.01)
*C08L 27/16* (2006.01)

(52) U.S. Cl.
USPC ........... 361/524; 524/148; 524/265; 524/301; 428/457

(58) Field of Classification Search
USPC ........... 361/524; 524/148, 265, 301; 428/457
See application file for complete search history.

(56) References Cited

U.S. PATENT DOCUMENTS 6,741,028 B2 * 5/2004 Tanabe et al. ................. 313/509
2009/0281224 A1 11/2009 Koh et al.
2009/0306264 A1 12/2009 Koh et al.

FOREIGN PATENT DOCUMENTS

| JP | 61-224205 A | 10/1986 |
|---|---|---|
| JP | 63-127515 A | 5/1988 |
| JP | 2005-008665 A | 1/2005 |
| JP | 2006-77193 A | 3/2006 |
| JP | 2007-5531 A | 1/2007 |
| JP | 2008-074699 A | 4/2008 |
| WO | 2007/088924 A1 | 8/2007 |
| WO | 2008/013048 A1 | 1/2008 |

OTHER PUBLICATIONS

A.J. Moulson, et al.; "Electroceramics: Materials, Properties, Applications" (1993).

* cited by examiner

*Primary Examiner* — Robert D. Harlan
(74) *Attorney, Agent, or Firm* — Sughrue Mion, PLLC

(57) ABSTRACT

The present invention provides a high dielectric film for a film capacitor obtained by molding a film forming composition for a film capacitor comprising a thermoplastic resin (A) and surface-treated high dielectric inorganic particles (B) obtained by treating the surfaces of high dielectric inorganic particles (b1) having a dielectric constant (20° C., 1 kHz) of 100 or more with a low dielectric compound (b2) having a dielectric constant (20° C., 1 kHz) of 10 or less. This high dielectric film for a film capacitor can restrain the decrease of electrical insulating property, in spite of the high dielectric inorganic particles being dispersed at a high filling rate.

13 Claims, No Drawings

COMPOSITION FOR FORMING HIGH DIELECTRIC FILM FOR FILM CAPACITOR

CROSS REFERENCE TO RELATED APPLICATIONS

This application is a National Stage of International Application No. PCT/JP2009/071236, filed Dec. 21, 2009, which claims priority from Japanese Patent Application No. 2008-326104, filed Dec. 22, 2008, the contents of all of which are incorporated herein by reference in their entirety.

TECHNICAL FIELD

The present invention relates to a composition used for forming a high dielectric film for a film capacitor and a high dielectric film for a film capacitor formed by the composition.

BACKGROUND ART

In recent years, plastic insulating materials are expected as film materials for film capacitors for communication, electronic devices, electric power, medium and low voltage phase advancement and inverter, piezoelectric devices, pyroelectric devices and dielectric materials for transfer printing carrier since they have a high insulation resistance, excellent frequency characteristics and excellent flexibility.

A film capacitor is usually comprised of a film structure comprising a dielectric resin film subjected to aluminum or zinc deposition on its surface, or a film structure comprising multi-layers of aluminum foils and dielectric resin films, and recently there are used a lot of film capacitors comprising a dielectric resin film and an electrode formed thereon by metal deposition.

Usually, a high dielectric film for a film capacitor is formed to be a single layer using a dielectric resin as a film forming resin. As the film forming resin, generally, a non-fluorine-containing thermoplastic resin having a high dielectric constant such as polyester, and polyphenylene sulfide (PPS) and a fluorine-containing resin such as vinylidene fluoride (VdF) are considered.

However, resins, which are organic compounds, have a limitation to the recent requirement towards high energy density, and the incorporation of high dielectric inorganic particles has been performed (Patent Documents 1 to 4).

PRIOR ART DOCUMENTS

Patent Documents

Patent Document 1: JP 2000-294447 A
Patent Document 2: JP 2002-356619 A
Patent Document 3: JP 2007-005531 A
Patent Document 4: JP 2008-034189 A

DISCLOSURE OF INVENTION

Problem to be Solved by the Invention

Conventionally, the improvement of dielectric constant or withstanding voltage of a film has been pursued by dispersing high dielectric inorganic particles into a resin uniformly. However, the blending of high dielectric inorganic particles into a resin at a high filling rate causes the decrease of electric insulation.

Means to Solve the Problem

After having made intensive studies for improving the electric insulation, the inventors have found that the above problem can be solved by blending specific surface-treated inorganic particles as high dielectric inorganic particles, and have made the present invention.

That is, the present invention relates to a film forming composition for a film capacitor comprising a thermoplastic resin (A) and surface-treated high dielectric inorganic particles (B) obtained by treating the surfaces of high dielectric inorganic particles (b1) having a dielectric constant (20° C., 1 kHz) of 100 or more with a low dielectric compound (b2) having a dielectric constant (20° C., 1 kHz) of 10 or less.

The dielectric constant (20° C., 1 kHz) of the high dielectric inorganic particles (b1) is preferably 300 or more.

The dielectric constant (20° C., 1 kHz) of the low dielectric compound (b2) is preferably 5 or less.

Moreover, the high dielectric inorganic particles (b1) are preferably at least one selected from the group consisting of:
(b1a) composite oxide particles represented by the formula (b1a):

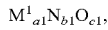

$$M^1_{a1}N_{b1}O_{c1},$$

wherein $M^1$ is a metal element of the group II of the periodic table; N is a metal element of the group IV of the periodic table; a1 is 0.9 to 1.1; b1 is 0.9 to 1.1; c1 is 2.8 to 3.2; and each of $M^1$ and N may be plural kinds, (b1b) composite oxide particles represented by the formula (b1b):

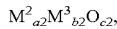

$$M^2_{a2}M^3_{b2}O_{c2},$$

wherein $M^2$ is different from $M^3$ and $M^2$ is a metal element of the group II of the periodic table while $M^3$ is a metal element of the period V of the periodic table; a2 is 0.9 to 1.1; b2 is 0.9 to 1.1; and c2 is 2.8 to 3.2, and (b1c) composite oxide particles comprising at least three kinds of metal elements selected from the group consisting of a metal element of the group II of the periodic table and a metal element of the group IV of the periodic table.

The low dielectric compound (b2) is preferably at least one selected from organic compounds.

Further, it is preferable that the high dielectric inorganic particles (b1) are at least one selected from the group consisting of barium titanate, barium calcium titanate zirconate and strontium titanate, and the low dielectric compound (b2) is at least one selected from the group consisting of an organotitanium compound, an organosilane compound, an organozirconium compound, an organoaluminum compound and an organic phosphorus compound.

A fluorine-containing thermoplastic resin (a1), a non-fluorine-containing thermoplastic resin (a2) and the combination thereof can be applied as the thermoplastic resin (A).

The composition of the present invention preferably comprises 10 to 300 parts by mass of the surface-treated high dielectric inorganic particles (B) based on 100 parts by mass of the thermoplastic resin (A).

The present invention further relates to a high dielectric film for a film capacitor obtained by forming the film forming composition of the present invention.

Furthermore, the present invention also relates to a high dielectric film for a film capacitor in which the surface-treated high dielectric inorganic particles (B) obtained by treating the surfaces of high dielectric inorganic particles (b1) having a dielectric constant (20° C., 1 kHz) of 100 or more with a low dielectric compound (b2) having a dielectric constant (20° C., 1 kHz) of 10 or less is dispersed in the thermoplastic resin (A).

The present invention further relates to a laminated high dielectric film for a film capacitor in which an insulating resin applied film layer is provided on at least one side of the above high dielectric film for the film capacitor.

The present invention yet further relates to a film capacitor in which an electrode layer is provided on at least one side of the high dielectric film for the film capacitor of the present invention.

Effect of the Invention

According to the present invention, it is possible to provide a high dielectric film for a film capacitor which can restrain the decrease of electric insulation, in spite of the high dielectric inorganic particles being blended at a high filling rate.

MODE FOR CARRYING OUT THE INVENTION

A film forming composition for a film capacitor of the present invention comprises a thermoplastic resin (A) and surface-treated high dielectric inorganic particles (B).

Hereinafter, each component will be explained.

(A) Thermoplastic Resin

The thermoplastic resin (A) can be either a fluorine-containing thermoplastic resin (a1) or a non-fluorine-containing thermoplastic resin (a2).

(a1) Fluorine-Containing Thermoplastic Resin

Examples of the fluorine-containing thermoplastic resin (a1) are copolymers prepared using tetrafluoroethylene (TFE), trifluoroethylene (TrFE), hexafluoropropylene (HFP) and perfluoro(alkyl vinyl ether) (PAVE) in addition to a vinylidene fluoride (VdF) resin. Among these, the VdF resin is preferable from the viewpoint of satisfactory solubility in a solvent.

Examples of the VdF resin are a copolymer of VdF and one or more monomers which can be copolymerized with VdF in addition to a homopolymer (PVdF) of VdF. Among these, one having a dielectric constant (20° C., 1 kHz) of 3 or more, further 5 or more, yet further 8 or more and particularly 10 or more is preferable, from the viewpoint of the improvement of withstanding voltage, insulation properties and dielectric constant, and a high dielectric constant of a formed film. Additionally, the upper limit is not limited particularly, and is normally 12 and preferably 11.

The VdF resin may be a homopolymer (PVdF) of a vinylidene fluoride (VdF) or a copolymer comprising VdF and other copolymerizable monomers. The VdF resin may also be a blend of the homopolymer of VdF and the VdF copolymer or a blend of VdF copolymers.

Examples of the other monomers which can be copolymerized with VdF are, for instance, fluorine-containing olefins such as tetrafluoroethylene (TFE), chlorotrifluoroethylene (CTFE), trifluoroethylene (TrFE), monofluoroethylene, hexafluoropropylene (HFP) and perfluoro(alkyl vinyl ether) (PAVE); a fluorine-containing acrylate and a fluorine-containing monomer having a functional group. Among these, TFE, CTFE and HFP are preferable from the viewpoint of satisfactory solubility in a solvent. The copolymerization in which a proportion of the VdF is 50 mol % or more and preferably 60 mol % or more is preferable, from the viewpoint of high dielectric constant and high solubility in a solvent.

Among these, a copolymer containing 60 to 100 mol % of the VdF unit, 0 to 40 mol % of the TFE unit and 0 to 40 mol % of the HFP unit is preferable, since the dielectric constant is 6 or more.

Specifically, a homopolymer of VdF (PVdF), a VdF/TFE copolymer, a VdF/TFE/HFP copolymer, a VdF/HFP copolymer and a VdF/CTFE copolymer etc. can be exemplified.

Among these, a PVdF, a VdF/TFE copolymer and a VdF/HFP copolymer are particularly preferable from the viewpoint of a high dielectric constant and satisfactory solubility in a solvent.

In the case of a VdF/TFE copolymer, it is preferable that the copolymer comprises 60 to 95 mol % of a VdF unit and 5 to 40 mol % of a TFE unit, especially preferably 70 to 90 mol % of a VdF unit and 10 to 30 mol % of a TFE unit, since a withstanding voltage becomes high. Further, in order to decrease a dielectric loss of a VdF resin, it is also preferable to copolymerize with ethylene, propylene, alkyl vinyl ether, vinyl acetate, vinyl chloride, vinylidene chloride, $CH_2=CHCF_3$ and $CH_2=CFCF_3$ or the like. In this case, since these substances are rarely allowed to react with a VdF directly, it is also possible to copolymerize these substances with the above other copolymerizable monomers such as TFE.

(a2) Non-Fluorine-Containing Thermoplastic Resin

Preferred examples of the non-fluorine-containing thermoplastic resin (a2) are polyesters such as polybutylene terephthalate (PBT), polyethylene terephthalate (PET) and polyethylene naphthalate (PEN); polycarbonate (PC); silicone resin, polyether, polyvinyl acetate, polyethylene and polypropylene (PP) and the like from the view point of good flexibility and high dielectric constant; poly(meth)acrylate such as polymethyl methacrylate, epoxy resin, polyethylene oxide, polypropylene oxide, polyphenylene oxide (PPO), polyphenylene sulfide (PPS), polyamide (PA), polyimide (PI), polyamide imide (PAI), PC, polystyrene and a polybenzimidazole (PBI) can be listed for increasing strength; odd number polyamide, cyano pullulan and a copper phthalocyanine polymer can be listed from the viewpoint of the supplement of high dielectric property; and a cellulose resin can be mentioned from the view point of the improvement of mechanical strength and insulation resistance. Among these, polycarbonate, polyethylene oxide, polypropylene oxide, poly(meth)acrylate, polyvinyl acetate and a cellulose resin are especially preferable, from the viewpoint of improving the mechanical strength and the insulation resistance.

Among these, when used together with the fluorine-containing thermoplastic resin (a1), at least one selected from the group consisting of a cellulose resin, a polyester resin and polymethyl methacrylate is especially preferable, from the viewpoint of good compatibility with the fluorine-containing thermoplastic resin (a1).

Especially, the blending of cellulose resins is effective in improving the dielectric constant and decreasing the dielectric loss.

Examples of cellulose resins are ester-substituted celluloses such as cellulose monoacetate, cellulose diacetate, cellulose triacetate and cellulose acetate propionate; and ether-substituted celluloses such as methyl cellulose, ethyl cellulose and hydroxypropyl methyl cellulose. Among these, celluloses (mono-, di-, tri-)acetate and methyl cellulose are preferred from the viewpoint of low temperature coefficient of the dielectric loss.

When blending a cellulose resin, the proportion of the cellulose resin in the thermoplastic resin (A) is preferably 0.1% by mass or more from the viewpoint of high dielectric constant and low dielectric loss and is further preferably 20% by mass or more from the viewpoint of good mechanical properties. Moreover, the proportion of the cellulose resin is preferably 99.9% by mass or less from the viewpoint of low dielectric loss, good mechanical properties and high dielectric constant, and is further preferably 98% by mass or less from the view point of low dependence of dielectric loss on temperature.

(B) Surface-Treated High Dielectric Inorganic Particles

The surface-treated high dielectric inorganic particles (B) are obtained by treating the surfaces of the high dielectric inorganic particles (b1) having a dielectric constant (20° C., 1 kHz) of 100 or more with the low dielectric compound (b2) having a dielectric constant (20° C., 1 kHz) of 10 or less.

The high dielectric inorganic particles (b1) are not limited as far as their dielectric constant (20° C., 1 kHz) is 100 or more. The preferable dielectric constant (20° C., 1 kHz) is 300 or more, further 500 or more, especially 1000 or more. While there is no upper limit of the dielectric constant of high dielectric inorganic particles (b1), the upper limit is about 3000 under the present circumstances.

The high dielectric inorganic particles (b1) are preferably at least one selected from the group consisting of the following (b1a) to (b1c).

(b1a) composite oxide particles represented by the formula (b1a):

$$M^1_{a1}N_{b1}O_{c1},$$

wherein $M^1$ is a metal element of the group II of the periodic table; N is a metal element of the group IV of the periodic table; a1 is 0.9 to 1.1; b1 is 0.9 to 1.1; c1 is 2.8 to 3.2; and each of $M^1$ and N may be plural kinds.

Preferable examples of the metal element $M^1$ of the group II of the periodic table are Be, Mg, Ca, Sr, Ba and the like and preferable examples of the metal element N of the group IV of the periodic table are Ti, Zr and the like.

Specifically, barium titanate, barium zirconate, calcium titanate, calcium zirconate, strontium titanate, strontium zirconate and the like can be exemplified, and barium titanate is particularly preferable from the viewpoint of a high dielectric constant.

(b1b) composite oxide particles represented by the formula (b1b):

$$M^2_{a2}M^3_{b2}O_{c2},$$

wherein $M^2$ is different from $M^3$ and $M^2$ is a metal element of the group II of the periodic table while $M^3$ is a metal element of the period V of the periodic table; a2 is 0.9 to 1.1; b2 is 0.9 to 1.1; and c2 is 2.8 to 3.2.

Particular examples of the composite oxide (b1b) are magnesium stannate, calcium stannate, strontium stannate, barium stannate, magnesium antimonate, calcium antimonate, strontium antimonate, barium antimonate, magnesium zirconate, calcium zirconate, strontium zirconate, barium zirconate, magnesium indate, calcium indate, strontium indate, barium indate and the like.

(b1c) composite oxide particles comprising at least three kinds of metal elements selected from the group consisting of a metal element of the group II of the periodic table and a metal element of the group IV of the periodic table.

In the composite oxide (b1c), specific examples of the metal element of the group II of the periodic table are Be, Mg, Ca, Sr, Ba and the like, and specific examples of the metal element of the group IV of the periodic table are Ti, Zr, Hf and the like.

Preferable combinations of three or more kinds of metal elements selected from the group consisting of a metal element of the group II of the periodic table and a metal element of the group IV of the periodic table are, for example, the combination of Sr, Ba and Ti, the combination of Sr, Ti and Zr, the combination of Sr, Ba and Zr, the combination of Ba, Ti and Zr, the combination of Sr, Ba, Ti and Zr, the combination of Mg, Ti and Zr, the combination of Ca, Ti and Zr, the combination of Ca, Ba and Ti, the combination of Ca, Ba and Zr, the combination of Ca, Ba, Ti and Zr, the combination of Ca, Sr and Zr, the combination of Ca, Sr, Ti and Zr, the combination of Mg, Sr and Zr, the combination of Mg, Sr, Ti and Zr, the combination of Mg, Ba, Ti and Zr, the combination of Mg, Ba and Zr and the like.

Particular examples of the composite oxide particles (b1c) are barium calcium titanate, strontium titanate zirconate, barium titanate zirconate, barium strontium titanate zirconate, a magnesium titanate zirconate, calcium titanate zirconate, barium calcium titanate zirconate and the like.

Among these, at least one selected from the group consisting of barium titanate, barium calcium titanate zirconate and strontium titanate is preferable from the viewpoint of a high dielectric constant.

In addition to these composite oxide particles, other composite oxide particles such as lead titanate zirconate, lead antimonate, zinc titanate, lead titanate, titanium oxide and the like can be combined.

The particle diameter of the high dielectric inorganic particles (b1) is preferably 2 μm or less in a mean particle diameter, further 1.2 μm or less, in particular about 0.01 to 0.5 μm, from the viewpoint of satisfactory surface smoothness of a film and uniform dispersibility.

The low dielectric compound (b2) has a role of increasing compatibility and adhesiveness with resins and of improving insulation properties. The low dielectric compound is not limited as far as its dielectric constant (20° C., 1 kHz) is 10 or less, and it may be an inorganic compound or an organic compound. A preferable dielectric constant (20° C., 1 kHz) is 5 or less, further 4 or less since the dielectric loss tangent is low and good. From the viewpoint of good dielectric property at a high temperature, a dielectric constant not more than 3 is further preferable. Though there is no lower limit of dielectric constant of the low dielectric compound (b2) particularly, it is normally about 2.

Moreover, the difference of dielectric constant between the high dielectric inorganic particles (b1) and the low dielectric compound (b2) is preferably 90 or more, additionally 100 or more, further 200 or more, particularly 300 or more, since a high dielectric property and a low dielectric loss tangent can be achieved.

In addition, it is preferable that the difference between the dielectric constant (20° C., 1 kHz) of the thermoplastic resin (A) and the dielectric constant (20° C., 1 kHz) of the low dielectric compound is 10 or less, further 5 or less, particularly 3 or less, since the dispersibility of high dielectric inorganic particles into the thermoplastic resin is good.

Particular examples of the low dielectric compound (b2) are preferably organic compounds, particularly at least one organic compound selected from the group consisting of the following (b2a) to (b2e), from the viewpoint of a high dielectric property and low dielectric loss tangent.

(b2a) Organotitanium Compound

Examples of the organotitanium compound are, for example, coupling agents such as alkoxy titanium, titanium chelate and titanium acylate. Particularly, alkoxy titanium and titanium chelate are preferable from the viewpoint of their good affinity for the high dielectric inorganic particles (b1).

Particular examples are tetraisopropyl titanate, titanium isopropoxyoctyleneglycolate, diisopropoxy•bis(acetylacetonate)titanium, diisopropoxytitanium diisostearate, tetraisopropyl bis(dioctyl phosphite) titanate, isopropyl tri(n-aminoethyl-aminoethyl)titanate and tetra(2,2-diallyloxymethyl-1-butyl)bis(di-tridecyl)phosphite titanate. Among these, tetra (2,2-diallyloxymethyl-1-butyl)bis(di-tridecyl)phosphite titanate is particularly preferable because of its good affinity for the high dielectric inorganic particles (b1).

(b2b) Organosilane Compound

Examples of the organosilane compound are, for instance, those of a high molecular weight type and a low molecular weight type, and from the viewpoint of the number of functional groups, coupling agents such as monoalkoxysilane, dialkoxysilane, trialkoxysilane and tetraalkoxysilane can be exemplified. Especially, from the viewpoint of satisfactory affinity for the high dielectric inorganic particles (b1), alkoxysilanes of the low molecular weight type are preferable.

Also, vinylsilane, epoxysilane, aminosilane, metachloxysilane, mercaptosilane and the like can be preferably used.

When alkoxysilane is used, more improvement of volume resistivity (improvement of electrical insulating property), which is an effect of the surface treatment, can be achieved by hydrolyzing.

(b2c) Organozirconium Compound

Examples of the organic zirconium compound are coupling agents such as alkoxyzirconium and zirconium chelate.

(b2d) Organoaluminum Compound

Examples of the organoaluminum compound are coupling agents such as alkoxyaluminum and aluminum chelate.

(b2e) Organic Phosphorus Compound

Examples of the organic phosphorus compound are a phosphorous acid ester, a phosphoric acid ester, a phosphoric acid chelate and the like.

Among these, at least one selected from the group consisting of alkoxytitanium, titanium chelate and alkoxysilane is preferable, since their affinity for the high dielectric inorganic compound (b1) is good.

Nonlimiting examples of a surface treatment method of the high dielectric inorganic particles (b1) with the low dielectric compound (b2) are those exemplified below.

(Surface Treatment Method 1) Wet Process

A water soluble organic solvent is added to the high dielectric inorganic particles (b1), and a slurry is prepared by stirring a mixture with a high speed stirrer or a homogenizer. To this slurry of the high dielectric inorganic particles (b1) is added a low dielectric compound (b2) or one diluted with water if necessary, and the mixture is stirred with a high speed stirrer or a homogenizer. Then the slurry is stirred as it is or with heating. The obtained dispersion is filtered and subjected to a drying process, and thereby surface-treated high dielectric inorganic particles (B) are produced. After drying, a crushing process using a ball mill or a beads mill can be performed if aggregation appears.

(Surface Treatment Method 2) Dry Process

A solvent-diluted low dielectric compound (b2) or one diluted with a solvent if necessary is added to the high dielectric inorganic particles (b1) with stirring using a mixing device such as a dry mixer, a dry beads mill or a Henschel mixer. After continuing the stirring, a drying process is performed to produce surface-treated high dielectric inorganic particles (B). After the drying, a crushing process using a ball mill or a beads mill can be performed if aggregation appears.

It is preferable that the amount of low dielectric compound (b2) is 0.1 to 20 parts by mass, further 0.5 to 10 parts by mass, especially 1 to 5 parts by mass based on 100 parts by mass of the high dielectric inorganic particles (b1). If the amount is too large, the excess low dielectric compound (b2) may have a bad influence on electrical property or the like, and if the amount is too small, surface-untreated high dielectric inorganic particles (b 1) are more likely to remain.

In the surface-treated high dielectric inorganic particles (B), the whole or a part of the surface of the high dielectric inorganic particles (b1) is covered with the low dielectric compound (b2).

The blending amount of the surface-treated high dielectric inorganic particles (B) is 10 parts by mass or more, preferably 50 parts by mass or more, especially preferably 150 parts by mass or more based on 100 parts by mass of the thermoplastic resin (A). If the amount is too small, the effect of improving the dielectric constant of the high dielectric film tends to decrease. The preferable upper limit is 300 parts by mass, since the obtained film tends to be fragile if the amount is too large. More preferable upper limit is 250 parts by mass.

Other components (C) can be blended to the film forming composition for a film capacitor of the present invention if necessary.

(C) Other Components (C1) Rubber Particles

Rubber particles (C1) fill the role of giving mechanical strength, especially elongation and further properties such as elasticity to the film.

Non-limiting examples of rubbers of rubber particles suitable for achieving such a role are diene rubbers such as a natural rubber (NR), a butadiene rubber (BR), a styrene-butadiene rubber (SBR), an isoprene rubber and a chloroprene rubber; an acrylic rubber, a silicone rubber and a nitrile rubber; fluorine-containing rubbers such as a VdF-tetrafluoroethylene (TFE) rubber, a TFE-perfluoro vinyl ether rubber and the like. Among these, an acrylic rubber and a butadiene rubber are preferable since their elongation and elasticity are fine.

The rubber particles may be un-crosslinked rubber (crude rubber) particles and may be crosslinked rubber particles. From the viewpoint of good tensile strength, elongation and elasticity, crosslinked rubber particles are preferred. The crosslinking of rubbers may be conducted by known method.

An average primary particle size of the rubber particles (C1) is preferably 1.0 μm or less, further preferably 0.8 μm or less, especially preferably 0.3 to 0.5 μm since dispersibility in the thermoplastic resin is good and these sizes excel in providing tensile strength and elongation.

The amount of rubber particles (C1) is 10 parts by mass or more, preferably 15 parts by mass or more, especially preferably 20 parts by mass or more based on 100 parts by mass of the thermoplastic resin (A). When the amount is too small, an effect of improving mechanical strength, especially elongation of the film tends to be decreased. An upper limit of the amount is 30 parts by mass. When the amount is too large, dispersibility into the thermoplastic resin tends to be inferior. A preferred upper limit is 25 parts by mass.

(C2) Affinity Improving Agent

In order to enhance the affinity of the surface-treated high dielectric inorganic particles (B) for the thermoplastic resin (A), an affinity improving agent (C2) may be blended. The affinity improving agent fills the role of not only uniformly dispersing the surface-treated high dielectric inorganic particles (B) into the thermoplastic resin (A) but also firmly bonding the surface-treated highly dielectric inorganic particles (B) with the thermoplastic resin (A) in the film, thereby the generation of voids can be inhibited and the dielectric constant can be enhanced.

Examples of the effective affinity improving agent are a coupling agent, a surfactant and an epoxy group-containing compound.

Coupling agents as the affinity improving agent (C2) may be the same as or different from the low dielectric compound (b2) which is used for the surface treatment of the high dielectric inorganic particles (b1). Those of the same kind are preferable since the affinity is further improved. Preferable specific examples of the coupling agents as the affinity improving agents (C2) are coupling agents such as an organotitanium compound, an organosilane compound, an organozirconium compound and an organoaluminum compound and an organic phosphorus compound, which are shown as the low dielectric compound (b2), and they can also be used here.

Examples of the surfactant are those of a high molecular weight type and a low molecular weight type, and from the viewpoint of kind of functional groups, there are a nonionic surfactant, an anionic surfactant and a cationic surfactant. Those can be used, and surfactants of a high molecular weight type are preferable from the viewpoint of satisfactory thermal stability.

Examples of the nonionic surfactant are, for instance, polyether derivatives, polyvinyl pyrrolidone derivatives and alcohol derivatives, and polyether derivatives are preferable especially from the viewpoint of satisfactory affinity for the surface-treated high dielectric inorganic particles (B).

Examples of the anionic surfactant are, for instance, polymers having moiety of sulfonic acid, carboxylic acid or salt thereof, and especially from the viewpoint of satisfactory affinity for the thermoplastic resin (A), preferable are acrylic acid derivative polymers, methacrylic acid derivative polymers, and maleic anhydride copolymers.

Examples of the cationic surfactant are, for instance, amine compounds, compounds having a nitrogen-containing complex ring such as imidazoline, and halogenated salts thereof, and compounds having a nitrogen-containing complex ring are preferable since they have less property of attacking the thermoplastic resin (A). Examples of the salts are ammonium salts having halogen anion such as alkyltrimethylammonium chloride. From the viewpoint of a high dielectric constant, ammonium salts having halogen anion are preferable.

Examples of the epoxy group-containing compound are epoxy compounds and glycidyl compounds, which may be low molecular weight compounds or high molecular weight compounds. Particularly preferable are low molecular weight compounds having one epoxy group from the viewpoint of especially satisfactory affinity for the thermoplastic resin (A). In the present invention, epoxy group-containing coupling agents (for example, epoxy silane) which are classified into a coupling agent are included in the coupling agent but not in the epoxy group-containing compound.

From the viewpoint of especially satisfactory affinity for the thermoplastic resin (A), preferable examples of the epoxy group-containing compound are compounds represented by the formula:

$$R-(C(=O))_l-(O)_m-(CH_2)_n-CH-CH_2\backslash O/$$

wherein R is a hydrogen atom or a monovalent hydrocarbon group having 1 to 10 carbon atoms which may have oxygen atom, nitrogen atom or carbon-carbon double bond, or an aromatic ring which may have a substituent; l is 0 or 1; m is 0 or 1; n is 0 or an integer of 1 to 10.

Examples thereof are:

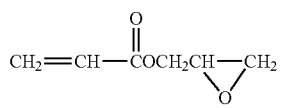

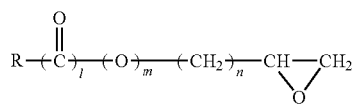

and the like, which have a ketone group or an ester group.

The affinity improving agent can be blended to an extent not to impair the object of the present invention. An amount thereof is from 0.01 to 30 parts by mass, further from 0.1 to 25 parts by mass, especially from 1 to 20 parts by mass based on 100 parts by mass of the surface-treated high dielectric inorganic particles (B) since it can be dispersed uniformly and dielectric constant of an obtained film is high.

In the present invention, additives such as other reinforcing filler may be contained as optional components to an extent not to impair the effect of the present invention.

Examples of reinforcing fillers are inorganic materials other than the high dielectric inorganic particles (b1), and for instance, are particles and fibers of silica, silicon carbide, silicon nitride, magnesium oxide, potassium titanate, glass, alumina and boron compounds.

The film forming composition for a film capacitor of the present invention can be prepared by mixing the thermoplastic resin (A) (which may contain, if necessary, the other components (C) explained above. Hereinafter the same) and the surface-treated high dielectric inorganic particles (B). Conventional melt-mixing methods or methods dissolving and dispersing the mixture into a solvent can be adopted.

The high dielectric film for a film capacitor of the present invention can be formed by treating the film forming composition for a film capacitor of the present invention by the melt-pressing method and the coating method, etc., and from the viewpoint of easy operation and good uniformity of the obtained film, it is advantageous to form the film by the coating method (casting method).

In the coating method, the film is formed by any of various coating methods using the coating composition prepared by adding the surface-treated high dielectric inorganic particles (B) and if necessary, the other components (C) to the thermoplastic resin (A) and dissolving or dispersing the mixture in a solvent.

For coating, an optional solvent being capable of dissolving or uniformly dispersing the thermoplastic resin (A) can be used, and especially polar organic solvents are preferred. Among polar organic solvents, for example, ketone solvents, ester solvents, carbonate solvents, cyclic ether solvents and amide solvents are preferred. Preferred examples are methyl ethyl ketone, methyl isobutyl ketone (MIBK), acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide (DMF) and dimethylacetamide.

For the coating, a knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed. Among these, a roll coating method, a gravure coating method and a cast coating method are preferred from the viewpoint that operation is easy, non-uniformity of a film thickness is small and productivity is satisfactory.

According to the coating method, since a uniform composition having a high concentration can be prepared and the coating is easy, the thickness of the obtained high dielectric film can be 20 μm or less, preferably 15 μm or less, further 10 μm or less. A lower limit of the film thickness is about 2 μm from the point of maintaining mechanical strength.

The high dielectric film for a film capacitor of the present invention can be a laminated high dielectric film in which an insulating resin applied film layer is provided on at least one side of the high dielectric film, in order to further improve electrical insulating property.

This insulating resin applied film layer improves electrical insulating property further as well as withstanding voltage. The reason is unrevealed, but relatively more voltage is applied on a film whose thickness is thinner because of partial pressure of the voltage. That is, it is assumed this is because high voltage is applied on the insulating resin having higher insulating property and the voltage load on the thermoplastic resin (A) is reduced.

Providing the insulating resin applied film layer on one side only is advantageous in improving insulation resistance and keeping high dielectric constant, and providing the same on both sides is advantageous in further improving electrical insulating property.

An insulating resin constituting the insulating resin applied film layer is preferably a non-fluorine-containing resin having volume resistivity of $10^{13}$ Ω·cm or more, preferably $10^{14}$ Ω·cm or more, especially $10^{15}$ Ω·cm or more, since its improving effect of electrical insulating property and withstanding voltage is good. The lower limit is preferably as small as possible, since it is preferable that the electric insulation is as high as possible (electric conductivity is as small as possible).

From this point of view, specific examples are polypropylene, polystyrene, polyester, polycarbonate, polyimide, cellulose resin and the like.

Further, from another point of view, the insulating resin is preferably a solvent soluble non-fluorine-containing resin, since the formation of the insulating resin applied film layer is easy.

Especially preferable specific examples are at least one selected from the group consisting of polystyrene, polyester, polymethyl methacrylate and cellulose resin.

The insulating resin applied film layer may consist of an insulating resin only or include other additives.

Examples of other additives are, for example, a plasticizer, a leveling agent, a deforming agent, an antioxidant, an antistatic agent, a flame retardant, a buffer material, a wettability improving agent, an inorganic oxide such as barium titanate, a rubber fine particle and the like. Their kinds and blended amount can be selected in the range not impairing the effect of the present invention.

The insulating resin applied film layer is laminated (formed) on the high dielectric film using the above explained insulating resin (non-fluorine-containing resin composition containing the above explained other additives or the like if necessary) with a conventional coating method. By forming the applied film with a coating method, the probability of the interfacial contact between the thermoplastic resin (A) and the surface-treated high dielectric inorganic particle (B) of the high dielectric film becomes higher, thus adhesion is further enforced. Therefore, the effect of further improving insulating property and of improving withstanding voltage is shown.

In coating methods, a film is formed using a coating composition prepared by adding other additives to an insulating resin if necessary and dissolving or dispersing the mixture into a solvent, according to coating methods of every kind.

Optional solvents which can dissolve an insulating resin can be used as a solvent for forming an insulating resin applied film layer. However, an insulating resin applied film layer excellent in adhesion and durability can be formed when a solvent having affinity for the thermoplastic resin (A) constituting the high dielectric film is used.

Polar organic solvents are preferred as a solvent. Among polar organic solvents, for example, ketone solvents, ester solvents, carbonate solvents, cyclic ether solvents and amide solvents are preferred. Preferred examples are methyl ethyl ketone, methyl isobutyl ketone (MIBK), acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide (DMF), dimethylacetamide and the like.

For the coating, a knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed. Among these, a roll coating method, a gravure coating method and a cast coating method are preferred from the viewpoint that operation is easy, non-uniformity of a film thickness is small and productivity is satisfactory.

It is preferable that the thickness of the obtained insulating resin applied film layer is 0.5 μm or more, preferably 1 μm or more, further preferably 2 μm or more, since good insulating property and the improvement of withstanding voltage can be obtained. From the viewpoint of keeping high dielectric properties, the upper limit is 5 μm, preferably 3 μm.

The film capacitor of the present invention can be prepared by laminating an electrode layer on at least one side of the high dielectric film of the present invention.

Examples of a structure of a film capacitor are a laminated type prepared by laminating electrode layers and high dielectric films alternately (JP 63-181411 A, JP 3-18113 A) and a rolled type prepared by rolling an electrode layer and a high dielectric film in the form of tape (one disclosed in JP60-262414A, in which an electrode is not laminated continuously on a high dielectric film, and another one disclosed in JP3-286514A, in which an electrode is laminated continuously on a high dielectric film). In the case of a rolled type film capacitor which is prepared by laminating an electrode continuously on a high dielectric film, has a simple structure and is produced relatively easily, generally the capacitor is produced by rolling two high dielectric films having an electrode laminated on one surface thereof so that the electrodes do not come into contact to each other, and then, if necessary, fixing the films not to get loose after the rolling.

The electrode layer is not limited particularly, and is a layer generally made of a conductive metal such as aluminum, zinc, gold, platinum or copper and used in the form of a metal foil or a deposition metal film. In the present invention, either a metal foil or a deposition metal film may be used or the both may be used together. Usually a deposition metal film is preferred since an electrode layer can be made thin, and as a result, capacity can be increased for its volume, adhesion to a dielectric film is excellent and unevenness of thickness is small. A deposition metal film is not limited to a single layer, and if necessary, may be a multi-layer prepared, for example, by a method of preparing an electrode layer by forming a semi-conductive aluminum oxide layer on an aluminum layer for giving moisture resistance (for example, JP2-250306A). A thickness of a deposition metal film also is not limited particularly, and is preferably within a range from 100 to 2,000 angstrom, more preferably within a range from 200 to 1,000 angstrom. The thickness of a deposition metal film within this range is suitable since capacity and strength of the capacitor are balanced.

When a deposition metal film is used as an electrode layer, a method of film formation is not limited particularly, and for example, a vacuum deposition method, a sputtering method, an ion plating method or the like can be adopted. Usually a vacuum deposition method is used.

Examples of a vacuum deposition method are a batch type for molded articles and a semi-continuous type and continuous (air to air) type for long articles, and currently a semi-continuous type vacuum deposition is mainly employed. A semi-continuous type metal deposition method is a method of carrying out metal deposition and rolling of a film in a vacuum system, bringing the vacuum system to air system, and then taking out the deposited film.

Specifically a semi-continuous type method can be carried out by a method described in JP 3664342 B in reference to FIG. 1.

In the case of forming a thin metal film layer on a high dielectric film, the surface of the high dielectric film can be previously subjected to corona treatment, plasma treatment or the like for improvement in adhesion. Also in the case of using a metal foil as an electrode layer, the thickness of the metal foil is not limited particularly, but is usually 0.1 to 100 μm, preferably 1 to 50 μm, more preferably 3 to 15 μm.

A fixing method is not limited particularly, and both of fixing and protection of a structure may be carried out at the same time, for example, by sealing with a resin or by putting in an insulation case and then sealing. A lead wire connection method also is not limited particularly, and the lead wire is fixed by welding, ultrasonic pressure welding or forge welding or with an adhesive tape. A lead wire may be connected to an electrode before rolling a film. In the case of putting in an insulation case with sealing, if necessary, an opening may be sealed with a thermosetting resin such as urethane resin or epoxy resin to prevent degradation by oxidation.

In case that the high dielectric film of the present invention is a laminated type having an insulating resin applied film layer, an electrode layer may be provided on the insulating resin applied film layer or on the other surface.

The film capacitor obtained by this means has high dielectric property, high insulating property and high withstanding voltage, and excels in mechanical strength, especially in elongation.

EXAMPLE

The present invention is then explained by means of examples, but is not limited to them.

The characteristic values used in the specification of the present invention are measured by the following methods.
(Thickness)
The thickness of a film placed on a substrate is measured at room temperature with a digital thickness meter (MF-1001 available from Sendai Nikon Corporation). The thickness of an insulating resin layer is calculated by measuring the whole thickness of an ultimate laminated type high dielectric film and subtracting the thickness of a VdF resin.

(Dielectric Loss and Dielectric Constant)
Both surfaces of a multiple film are subjected to aluminum deposition in vacuo to prepare a sample. An electrostatic capacity and dielectric loss tangent of this sample are measured under dry air atmosphere at room temperature (20° C.) and at 80° C. at a frequency of 100 Hz to 10 kHz with a LCR meter (ZM2353 available from NF Corporation). The dielectric constant and dielectric loss (%) are calculated from the measured electrostatic capacity and dielectric loss tangent.
(Electrical Insulating Property)
Volume resistivity (Ω·cm) is measured at DC500 V under dry air atmosphere with a digital electronic insulation tester/micro current meter (available from DKK-TOA CORPORATION).
(Withstanding Voltage)
Withstanding voltage of a film placed on a substrate is measured under dry air atmosphere with a withstanding voltage/insulation resistance tester (TOS9201 available from KIKUSUI ELECTRONICS CORP.). In the measurement, a voltage elevating rate is 100 V/s.

Preparation Example 1

100 Parts by mass of barium calcium titanate zirconate (BCTZ) (available from Nippon Chemical Industrial Co., Ltd., dielectric constant: 2,000 (20° C., 1 kHz). Inorganic particles b1-1) having a mean particle diameter of 1.0 μm was added to 100 parts by mass of purified water, and the mixture was stirred to prepare slurry.

To this slurry was added a solution (having a concentration of 1% by mass) prepared by dissolving 1 part by mass of tetramethoxysilane (dielectric constant: 3 (20° C., 1 kHz). Compound b2-1.) as a low dielectric compound into N, N-dimethylacetamide (DMAc). Zirconia beads of 1 mm in diameter having the same mass were further added and the mixture was put into a desktop planetary ball mill (Planet M available from Gokin Planetaring Inc.), followed by 15-minute dispersal treatment at the rotation number of 800 rpm under room temperature, and slurry of surface-treated high dielectric inorganic particles was prepared. After passing this slurry through a stainless steel mesh (80 mesh available from MANABE KOGYO CO., LTD.) to remove zirconia beads, surface-treated high dielectric inorganic particles were obtained by drying at 100° C. with a vacuum drier.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 2

Surface-treated high dielectric inorganic particles were prepared in the same manner as in Preparation Example 1 except that the amount of tetramethoxysilane (Compound b2-1) as a low dielectric compound was changed to 0.1 part by mass.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 3

Surface-treated high dielectric inorganic particles were prepared in the same manner as in Preparation Example 1 except that the amount of tetramethoxysilane (Compound b2-1) as a low dielectric compound was changed to 5 parts by mass.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 4

Surface-treated high dielectric inorganic particles were prepared in the same manner as in Preparation Example 1 except that 1 part by mass of an organotitanium compound (tetra(2,2-diallyloxymethyl-1-butyl)bis(di-tridecyl)phosphite)titanate. Compound b2-2) was used instead of tetramethoxysilane as a low dielectric compound.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 5

Surface-treated high dielectric inorganic particles were prepared in the same manner as in Preparation Example 1 except that 1 part by mass of an organozirconium compound (tetra(2,2-diallyloxymethyl-1-butyl)bis(di-tridecyl)phosphite zirconate. Compound b2-3) was used instead of tetramethoxysilane as a low dielectric compound.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 6

Surface-treated high dielectric inorganic particles were prepared in the same manner as in Preparation Example 1 except that 1 part by mass of organoaluminum compound (alkylacetoacetate aluminum diisopropynate. Dielectric constant: 6 (20° C., 1 kHz). Compound b2-4) was used instead of tetramethoxysilane as a low dielectric compound.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Preparation Example 7

Surface-treated high dielectric inorganic particles were prepared in the same manner as in Preparation Example 1 except that 1 part by mass of an organic phosphorus compound (acid phosphooxyethyl methacrylate. Dielectric constant: 5 (20° C., 1 kHz). Compound b2-5) was used instead of tetramethoxysilane as a low dielectric compound.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

Example 1

In a 3-liter separable flask, 800 parts by mass of N, N-dimethylacetamide (DMAc) (available from Kishida Chemical Co., Ltd.) and 200 parts by mass of polyvinylidene fluoride (PVdF) (KAYNAR 761 available from ARKEMA, Inc., dielectric constant of 9.2 (20° C., 1 kHz)) were stirred at 80° C. for three hours with a three-one motor, and a PVdF solution having a concentration of 20% by mass was obtained. The PVdF solution was a uniform clear solution.

34 Parts by mass of the surface-treated high dielectric inorganic particles dispersion prepared in Preparation Example 1, 50 parts by mass of the above PVdF solution (containing 10.0 parts by mass of PVdF and 40.0 parts by mass of DMAc) and 26.7 parts by mass of MIBK were mixed to prepare a coating composition.

Then the obtained composition was applied on an aluminum substrate by a bar coater, and dried with hot air at 180° C. for three minutes to form an about 7.0 μm thick VdF resin film.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 1.

Examples 2 to 7

High dielectric films were prepared in the same manner as in Example 1 except that the dispersions of surface-treated high dielectric inorganic particles produced in Preparation Examples 2 to 7 were used as a dispersion of surface-treated high dielectric inorganic particles.

The volume resistivity, withstanding voltage, dielectric loss and dielectric constant at each frequency (100 Hz, 1 kHz and 10 kHz) at 20° C. and 80° C. of the obtained films were evaluated. The results are shown in Table 2.

Comparative Example 1

A high dielectric film was prepared in the same manner as in Example 1, except that the BCTZ used in Preparation Example 1 was used as it was without surface treatment.

The volume resistivity, withstanding voltage, dielectric loss and dielectric constant at each frequency (100 Hz, 1 kHz and 10 kHz) at 20° C. and 80° C. of the obtained high dielectric film for comparison were evaluated. The results are shown in Table 1.

TABLE 1

|  | Ex. | | | |
| --- | --- | --- | --- | --- |
|  | 1 | 2 | 3 | 4 |
| Composition (parts by mass) | | | | |
| Thermoplastic resin | | | | |
| PVdF | 100 | 100 | 100 | 100 |
| Surface-treated high dielectric inorganic particle (B) | 175 | 175 | 175 | 175 |

TABLE 1-continued

|  | | | | | | | | |
|---|---|---|---|---|---|---|---|---|
| High dielectric inorganic particle (b1) | b1-1 | | b1-1 | | b1-1 | | b1-1 | |
| Low dielectric compound (b2) | b2-1 | | b2-1 | | b2-2 | | b2-2 | |
| (b1)/(b2) (mass ratio) | 100/1 | | 100/0.1 | | 100/5 | | 100/1 | |
| Whole thickness of a film (μm) | 7.0 | | 7.2 | | 7.1 | | 7.7 | |
| Volume resistivity (Ω · cm) | $3.0 \times 10^{14}$ | | $1.5 \times 10^{14}$ | | $1.5 \times 10^{14}$ | | $3.3 \times 10^{14}$ | |
| Withstanding voltage (V/μm) | 240 | | 210 | | 210 | | 250 | |
| Measurement temperature | 20° C. | 80° C. | 20° C. | 20° C. | 20° C. | 80° C. | 20° C. | 80° C. |
| Dielectric constant | | | | | | | | |
| 100 Hz | 41 | 49 | 42 | 43 | 39 | 45 | 31 | 39 |
| 1 kHz | 39 | 43 | 39 | 40 | 37 | 39 | 29 | 35 |
| 10 kHz | 37 | 38 | 37 | 38 | 34 | 36 | 28 | 29 |
| Dielectric loss (%) | | | | | | | | |
| 100 Hz | 4.0 | 5.5 | 4.1 | 4.1 | 3.5 | 5.2 | 4.0 | 5.5 |
| 1 kHz | 2.1 | 7.6 | 2.3 | 2.2 | 2.1 | 7.0 | 2.1 | 7.6 |
| 10 kHz | 2.0 | 5.2 | 2.1 | 2.0 | 2.0 | 4.7 | 2.0 | 5.2 |

|  | Ex. | | | | | | Com. Ex. | |
|---|---|---|---|---|---|---|---|---|
|  | 5 | | 6 | | 7 | | 1 | |
| Composition (parts by mass) | | | | | | | | |
| Thermoplastic resin | | | | | | | | |
| PVdF | 100 | | 100 | | 100 | | 100 | |
| Surface-treated high dielectric inorganic particle (B) | 175 | | 175 | | 175 | | 175 | |
| High dielectric inorganic particle (b1) | b1-1 | | b1-1 | | b1-1 | | b1-1 | |
| Low dielectric compound (b2) | b2-3 | | b2-4 | | b2-5 | | — | |
| (b1)/(b2) (mass ratio) | 100/1 | | 100/1 | | 100/1 | | 100/0 | |
| Whole thickness of a film (μm) | 7.5 | | 7.5 | | 7.1 | | 7.2 | |
| Volume resistivity (Ω · cm) | $3.5 \times 10^{14}$ | | $1.8 \times 10^{14}$ | | $2.8 \times 10^{14}$ | | $1.0 \times 10^{14}$ | |
| Withstanding voltage (V/μm) | 260 | | 210 | | 230 | | 200 | |
| Measurement temperature | 20° C. | 80° C. | 20° C. | 80° C. | 20° C. | 80° C. | 20° C. | 80° C. |
| Dielectric constant | | | | | | | | |
| 100 Hz | 42 | 49 | 39 | 44 | 45 | 52 | 43 | 52 |
| 1 kHz | 39 | 42 | 35 | 38 | 42 | 45 | 40 | 46 |
| 10 kHz | 38 | 39 | 33 | 33 | 39 | 41 | 38 | 40 |
| Dielectric loss (%) | | | | | | | | |
| 100 Hz | 4.3 | 6.0 | 4.4 | 6.2 | 4.4 | 6.4 | 4.5 | 6.2 |
| 1 kHz | 2.3 | 7.9 | 2.3 | 8.0 | 2.4 | 8.2 | 2.3 | 8.0 |
| 10 kHz | 2.2 | 5.6 | 2.4 | 5.5 | 2.5 | 6.0 | 2.0 | 5.5 |

From Table 1, it can be seen that the volume resistivity and the withstanding voltage of the films improve by adding surface-treated high dielectric inorganic particles.

Examples 8 to 10

High dielectric films were prepared in the same manner as in Example 1 except that the amount of surface-treated high dielectric inorganic particles (based on 100 parts by mass of a thermoplastic resin) was set at the amount shown in Table 2.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 2.

Example 11

A coating composition comprising a polyester solution having a concentration of 15% by mass was applied on one side of the high dielectric film obtained in Example 1 by a bar coater, followed by drying with hot air at 180° C. for three minutes to form an insulating resin layer. Thus a laminated high dielectric film was prepared and the thickness of the insulating resin layer was 1.0 μm.

The volume resistivity, withstanding voltage, dielectric loss and dielectric constant at each frequency (100 Hz, 1 kHz and 10 kHz) at 20° C. and 80° C. of the obtained laminated high dielectric film were evaluated. The results are shown in Table 2.

Example 12

A coating composition comprising a polyester solution having a concentration of 15% by mass was applied on one side of the high dielectric film obtained in Example 3 by a bar coater, followed by drying with hot air at 180° C. for three minutes to form an insulating resin layer. Thus a laminated high dielectric film was prepared and the thickness of the insulating resin layer was 0.8 μm.

The volume resistivity, withstanding voltage, dielectric loss and dielectric constant at each frequency (100 Hz, 1 kHz and 10 kHz) at 20° C. and 80° C. of the obtained laminated high dielectric film were evaluated. The results are shown in Table 2.

TABLE 2

| | Ex. | | | | |
|---|---|---|---|---|---|
| | 8 | 9 | 10 | 11 | 12 |
| Composition (parts by mass) Thermoplastic resin | | | | | |
| PVdF | 100 | 100 | 100 | 100 | 100 |
| Surface-treated high dielectric inorganic particle (B) | 50 | 100 | 200 | 175 | 175 |
| High dielectric inorganic particle (b1) | b1-1 | b1-1 | b1-1 | b1-1 | b1-1 |
| Low dielectric compound (b2) | b2-1 | b2-1 | b2-1 | b2-1 | b2-2 |
| (b1)/(b2) (mass ratio) | 100/1 | 100/1 | 100/1 | 100/1 | 100/1 |
| Whole thickness of a film (μm) | 7.0 | 7.1 | 7.4 | 8.0 | 8.5 |
| Electric insulating layer (μm) | — | — | — | 1.0 | 0.8 |
| Volume resistivity (Ω · cm) | $4.0 \times 10^{14}$ | $3.2 \times 10^{14}$ | $2.4 \times 10^{14}$ | $4.5 \times 10^{15}$ | $3.7 \times 10^{15}$ |
| Withstanding voltage (V/μm) | 260 | 245 | 220 | 320 | 310 |
| Measurement temperature | 20° C.   80° C. | 20° C.   80° C. | 20° C.   80° C. | 20° C.   80° C. | 20° C.   80° C. |
| Dielectric constant | | | | | |
| 100 Hz | 15   18 | 22   24 | 46   55 | 18   20 | 21   24 |
| 1 kHz | 14   17 | 21   23 | 44   47 | 17   19 | 20   23 |
| 10 kHz | 14   16 | 20   23 | 41   44 | 17   19 | 19   23 |
| Dielectric loss (%) | | | | | |
| 100 Hz | 5.6   6.4 | 4.9   5.8 | 3.7   5.1 | 1.6   3.0 | 1.8   3.3 |
| 1 kHz | 2.8   8.6 | 2.4   8.1 | 2.0   7.2 | 1.5   2.9 | 1.6   3.0 |
| 10 kHz | 2.7   5.9 | 2.4   5.5 | 2.0   4.9 | 1.5   2.5 | 1.5   2.8 |

From Table 2, it can be seen that the more the added amount of the surface-treated high dielectric inorganic particles increases, the higher the dielectric constant of the obtained film is. Further, it can also be seen that the volume resistivity and withstanding voltage of the films largely improve by forming an insulating resin layer on one side of the film.

Example 13

Into a 3-liter separable flask were poured 800 parts by mass of N,N-dimethylacetamide (DMAc) (available from Kishida Chemical Co., Ltd.) and 200 parts by mass of cellulose acetate (AC) (L-20 available from Daicel Chemical Industries, Ltd., dielectric constant 3.0 (20° C., 1 kHz)), followed by a stirring at 80° C. for three hours with a mechanical stirrer to obtain an AC solution having a concentration of 20% by mass. The AC solution was a uniform clear solution.

34 Parts by mass of the dispersion of surface-treated high dielectric inorganic particles prepared in Preparation Example 1, 50 parts by mass of the above AC solution (containing 10.0 parts by mass of AC and 40.0 parts by mass of DMAc) and 26.7 parts by mass of MIBK were mixed to prepare a coating composition.

Then the obtained composition was applied on an aluminum substrate by a bar coater, and dried with hot air at 180° C. for one minute to form an about 7.3 μm thick AC resin film.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 3.

Example 14

A coating composition comprising a polyester solution having a concentration of 15% by mass was applied on one side of the high dielectric film obtained in Example 13 by a bar coater, followed by drying with hot air at 180° C. for three minutes to form an insulating resin layer. Thus a laminated high dielectric film was prepared and the thickness of the insulating resin layer was 0.8 μm.

The volume resistivity, withstanding voltage, dielectric loss and dielectric constant at each frequency (100 Hz, 1 kHz and 10 kHz) at 20° C. and 80° C. of the obtained laminated high dielectric film were evaluated. The results are shown in Table 3.

Comparative Example 2

A high dielectric film was prepared in the same manner as in Example 13 except that the BCTZ used in Preparation Example 1 was used as it was without surface treatment.

The volume resistivity, withstanding voltage, dielectric loss and dielectric constant at each frequency (100 Hz, 1 kHz and 10 kHz) at 20° C. and 80° C. of the obtained high dielectric film for comparison were evaluated. The results are shown in Table 3.

TABLE 3

| | Ex. | | Com. Ex. |
|---|---|---|---|
| | 13 | 14 | 2 |
| Composition (parts by mass) Thermoplastic resin | | | |
| AC | 100 | 100 | 100 |
| Surface-treated high dielectric inorganic particle (B) | 175 | 175 | 175 |
| High dielectric inorganic particle (b1) | b1-1 | b1-1 | b1-1 |

TABLE 3-continued

|  | Ex. | | Com. Ex. |
| --- | --- | --- | --- |
|  | 13 | 14 | 2 |
| Low dielectric compound (b2) | b2-1 | b2-1 | — |
| (b1)/(b2) (mass ratio) | 100/1 | 100/1 | 100/0 |
| Whole thickness of a film (μm) | 7.3 | 8.1 | 7.2 |
| Electric insulating layer (μm) | — | 0.8 | — |
| Volume resistivity (Ω · cm) | $3.5 \times 10^{14}$ | $4.9 \times 10^{14}$ | $3.5 \times 10^{14}$ |
| Withstanding voltage (V/μm) | 270 | 350 | 250 |
| Measurement temperature | 20° C.   80° C. | 20° C.   80° C. | 20° C.   80° C. |
| Dielectric constant | | | |
| 100 Hz | 13   12 | 9   10 | 15   14 |
| 1 kHz | 12   11 | 8   9 | 14   13 |
| 10 kHz | 11   11 | 8   8 | 14   13 |
| Dielectric loss (%) | | | |
| 100 Hz | 2.9   2.5 | 1.7   2.8 | 3.0   2.6 |
| 1 kHz | 2.6   2.2 | 1.5   2.7 | 2.7   2.2 |
| 10 kHz | 3.1   2.2 | 1.4   2.4 | 3.1   2.4 |

From Table 3, it can be seen that the volume resistivity and withstanding voltage of the films improve by adding surface-treated high dielectric inorganic particles, in the case of a non-fluorine-containing thermoplastic resin, a thermoplastic resin of a fluorine-containing copolymer or even in the case that the fluorine-containing thermoplastic resin and the non-fluorine-containing thermoplastic resin are blended. In addition, it can be also seen that the volume resistivity and withstanding voltage of the films largely improve by forming an insulating resin layer on one side of the film.

Example 15

A VdF resin film (a1) having the thickness of 6.7 μm was obtained in the same manner as in Example 1 except that VdF/TFE (VP-50 available from DAIKIN INDUSTRIES, LTD., dielectric constant of 9.0 (1 kHz, 25° C.)) was used as a VdF resin film layer (a1) instead of polyvinylidene fluoride (PVdF).

The volume resistivity, withstanding voltage, dielectric loss and dielectric constant at each frequency (100 Hz, 1 kHz and 10 kHz) at 20° C. and 80° C. of the obtained film were evaluated. The results are shown in Table 4.

Example 16

Into a 3-liter separable flask were poured 800 parts by mass of N, N-dimethylacetamide (DMAc) (available from Kishida Chemical Co., Ltd.) and 200 parts by mass of cellulose acetate (AC) (L-20 available from Daicel Chemical Industries, Ltd., dielectric constant of 3.0 (20° C., 1 kHz)), followed by a stirring at 80° C. for three hours with a mechanical stirrer to obtain an AC solution having a concentration of 20% by mass. The AC solution was a uniform clear solution.

A VdF resin film (a1) having the thickness of 7.2 μm was obtained in the same manner as in Example 1 except that a blended solution of 400 parts by mass of a PVdF solution (containing 8.0 parts by mass of PVdF and 32.0 parts by mass of DMAc) and 10 parts by mass of an AC solution (containing 2.0 parts by mass of AC and 8.0 parts by mass of DMAc) was used instead of 50 parts by mass of the PVdF solution.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 4.

Example 17

Into a 3-liter separable flask were poured 800 parts by mass of N, N-dimethylacetamide (DMAc) (available from Kishida Chemical Co., Ltd.) and 200 parts by mass of methyl methacrylate (PMMA) (RX-083 available from MITSUBISHI RAYON CO., LTD., dielectric constant of 3.0 (20° C., 1 kHz)), followed by a stirring at 80° C. for three hours with a mechanical stirrer to obtain a PMMA solution having a concentration of 20% by mass. The PMMA solution was a uniform clear solution.

A VdF resin film (a1) having the thickness of 7.4 μm was obtained in the same manner as in Example 1 except that a blended solution of 40 parts by mass of a PVdF solution (containing 8.0 parts by mass of PVdF and 32.0 parts by mass of DMAc) and 10 parts by mass of a PMMA solution (containing 2.0 parts by mass of PMMA and 8.0 parts by mass of DMAc) was used instead of 50 parts by mass of the PVdF solution.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 4.

TABLE 4

|  | Ex. | | |
| --- | --- | --- | --- |
|  | 15 | 16 | 17 |
| Composition (parts by mass) | | | |
| Thermoplastic resin | | | |
| PVdF | — | 80 | 80 |
| VdF/TFE | 100 | — | — |

TABLE 4-continued

| | Ex. | | |
|---|---|---|---|
| | 15 | 16 | 17 |
| AC | — | 20 | — |
| PMMA | — | — | 20 |
| Surface-treated high dielectric inorganic particle (B) | 175 | 175 | 175 |
| High dielectric inorganic particle (b1) | b1-1 | b1-1 | b1-1 |
| Low dielectric compound (b2) | b2-1 | b2-1 | b2-1 |
| (b1)/(b2) (mass ratio) | 100/1 | 100/1 | 100/1 |
| Whole thickness of a film (μm) | 6.7 | 7.2 | 7.4 |
| Volume resistivity (Ω · cm) | $5.2 \times 10^{13}$ | $3.5 \times 10^{14}$ | $1.7 \times 10^{14}$ |
| Withstanding voltage (V/μm) | 220 | 250 | 250 |
| Measurement temperature | 20° C.   80° C. | 20° C.   80° C. | 20° C.   80° C. |
| Dielectric constant | | | |
| 100 Hz | 41   46 | 26   28 | 28   30 |
| 1 kHz | 40   45 | 25   26 | 27   27 |
| 10 kHz | 40   43 | 23   23 | 24   25 |
| Dielectric loss (%) | | | |
| 100 Hz | 2.4   3.8 | 3.5   4.3 | 4.1   5.0 |
| 1 kHz | 2.0   3.0 | 2.0   5.8 | 2.9   6.7 |
| 10 kHz | 2.0   2.8 | 1.8   4.2 | 2.6   6.5 |

From Table 4, it can be seen that the good volume resistivity and withstanding voltage of the films are obtained by adding surface-treated high dielectric inorganic particles, in the case of a thermoplastic resin of a fluorine-containing copolymer or even in the case that the fluorine-containing thermoplastic resin and the non-fluorine-containing thermoplastic resin are blended.

Example 18

Surface-treated high dielectric inorganic particles were prepared in the same manner as in Preparation Example 1 except that 100 parts by mass of strontium titanate (ST-03 available from SAKAI CHEMICAL INDUSTRY CO., LTD., dielectric constant of 300 (20° C., 1 kHz), mean particle diameter of 0.3 μm. Inorganic particle b1-2) was used as a high dielectric inorganic particle instead of BCTZ.

Then, 166 parts by mass of the obtained surface-treated high dielectric inorganic particles, 100 parts by mass of DMAc and 66.3 parts by mass of methyl isobutyl ketone (MIBK) were stirred and mixed to produce a dispersion of the surface-treated high dielectric inorganic particles.

A VdF resin film (a1) having the thickness of 6.8 μm was obtained in the same manner as in Example 1 except that this dispersion of surface-treated high dielectric inorganic particles was used.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 5.

Example 19

A dispersion of surface-treated high dielectric inorganic particles was produced in the same manner as in Preparation Example 1 except that strontium zirconate (available from KOJUNDO CHEMICAL LABORATORY CO., LTD., dielectric constant of 100 (20° C., 1 kHz), mean particle diameter of 1 μm. Inorganic particle b1-3) was used as a high dielectric inorganic particle (b1) instead of a barium calcium titanate zirconate (BCTZ).

A VdF resin film (a1) having the thickness of 6.7 μm was obtained in the same manner as in Example 1 except that this dispersion of surface-treated high dielectric inorganic particles was used.

The volume resistivity, withstanding voltage, dielectric loss and dielectric constant at each frequency (100 Hz, 1 kHz and 10 kHz) at 20° C. and 80° C. of the obtained film were evaluated. The results are shown in Table 5.

Example 20

A dispersion of surface-treated high dielectric inorganic particles was produced in the same manner as in Preparation Example 1 except that barium titanate (BT) (BT-4FB available from Nippon Chemical Industrial Co., Ltd., dielectric constant of 2,500 (20° C., 1 kHz), mean particle diameter of 0.7 μm. Inorganic particle b1-4) was used as a high dielectric inorganic particle (b1) instead of barium calcium titanate zirconate (BCTZ).

A VdF resin film (a1) having the thickness of 7.0 μm was obtained in the same manner as in Example 1 except that this dispersion of surface-treated high dielectric inorganic particles was used.

The volume resistivity, withstanding voltage, dielectric loss and dielectric constant at each frequency (100 Hz, 1 kHz and 10 kHz) at 20° C. and 80° C. of the obtained film of the present invention were evaluated. The results are shown in Table 5.

TABLE 5

| | Example | | |
|---|---|---|---|
| | 18 | 19 | 20 |
| Composition (parts by mass) Thermoplastic resin | | | |
| PVdF | 100 | 100 | 100 |
| Surface-treated high dielectric inorganic particle (B) | 175 | 175 | 175 |
| High dielectric inorganic particle (b1) | b1-2 | b1-3 | b1-4 |
| Low dielectric compound (b2) | b2-1 | b2-1 | b2-1 |
| (b1)/(b2) (mass ratio) | 100/1 | 100/1 | 100/1 |
| Whole thickness of a film (μm) | 6.8 | 6.7 | 7.0 |
| Volume resistivity (Ω · cm) | $1.8 \times 10^{14}$ | $2.6 \times 10^{14}$ | $2.5 \times 10^{14}$ |
| Withstanding voltage (V/μm) | 200 | 230 | 220 |
| Measurement temperature | 20° C.    80° C. | 20° C.    80° C. | 20° C.    80° C. |
| Dielectric constant | | | |
| 100 Hz | 31      39 | 25      32 | 47      55 |
| 1 kHz | 29      35 | 23      28 | 44      48 |
| 10 kHz | 28      29 | 22      24 | 40      44 |
| Dielectric loss (%) | | | |
| 100 Hz | 4.0     5.5 | 4.2     5.3 | 8.6    15.1 |
| 1 kHz | 2.1     7.6 | 2.2     7.8 | 4.4     9.4 |
| 10 kHz | 2.0     5.2 | 2.1     4.9 | 3.7     5.8 |

From Table 5, it can be seen that a good volume resistivity of the film is obtained, independent of the variety of high dielectric inorganic particles.

Example 21

Electrodes were formed on both surfaces of the high dielectric film prepared in Example 1 by deposition of aluminum with a vacuum evaporator (VE-2030 available from VACUUM DEVICE INC.) so as to have 3Ω/□. A lead wire for applying voltage was fit to these aluminum electrodes to prepare a film capacitor of stamp type (for easy evaluation).

The invention claimed is:

1. A film forming composition for a film capacitor, said composition comprises a thermoplastic resin (A) and surface-treated high dielectric inorganic particles (B) obtained by treating surfaces of high dielectric inorganic particles (b1) having a dielectric constant (20° C., 1 kHz) of 100 or more with a low dielectric compound (b2) having a dielectric constant (20° C., 1 kHz) of 10 or less, said low dielectric compound (b2) being at least one organic compound selected from the group consisting of an organotitanium compound, an organosilane compound, an organozirconium compound, an organoaluminum compound and an organic phosphorus compound, and a blended amount of said low dielectric compound (b2) being 0.1 to 20 parts by mass based on 100 parts by mass of the high dielectric inorganic particles (b1), said organotitanium compound is alkoxy titanium, titanium chelate or titanium acylate, said organosilane compound is monoalkoxysilane, dialkoxysilane, trialkoxysilane, tetraalkoxysilane, vinylsilane, epoxysilane, aminosilane, metachloxysilane or mercaptosilane, said organic zirconium compound is alkoxyzirconium or zirconium chelate, said organoaluminum compound is alkoxyaluminum or aluminum chelate, and said organic phosphorus compound is phosphorous acid ester, phosphoric acid ester or phosphoric acid chelate.

2. The composition of claim 1, wherein the dielectric constant (20° C., 1 kHz) of the high dielectric inorganic particles (b1) is 300 or more.

3. The composition of claim 1, wherein the dielectric constant (20° C., 1 kHz) of the low dielectric compound (b2) is 5 or less.

4. The composition of claim 1, wherein the high dielectric inorganic particles (b1) are at least one selected from the group consisting of:

(b1a) composite oxide particles represented by the formula (b1a):

wherein $M^1$ is a metal element of the group II of the periodic table; N is a metal element of the group IV of the periodic table; a1 is 0.9 to 1.1; b1 is 0.9 to 1.1; c1 is 2.8 to 3.2; and each of $M^1$ and N may be plural kinds, (b1b) composite oxide particles represented by the formula (b1b):

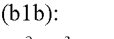

wherein $M^2$ is different from $M^3$, and $M^2$ is a metal element of the group II of the periodic table while $M^3$ is a metal element of the period V of the periodic table; a2 is 0.9 to 1.1; b2 is 0.9 to 1.1; and c2 is 2.8 to 3.2, and (b1c) composite oxide particles comprising at least three kinds of metal elements selected from the group consisting of a metal element of the group II of the periodic table and a metal element of the group IV of the periodic table.

5. The composition of claim 1, wherein the high dielectric inorganic particles (b1) are at least one selected from the group consisting of barium titanate, barium calcium titanate zirconate and strontium titanate, and the low dielectric compound (b2) is at least one selected from the group consisting of an organotitanium compound, an organosilane compound, an organozirconium compound, an organoaluminum compound and an organic phosphorus compound.

6. The composition of claim 1, wherein the thermoplastic resin (A) is at least one selected from the group consisting of a fluorine-containing thermoplastic resin (a1) and a non-fluorine-containing thermoplastic resin (a2).

7. The composition of claim 1, wherein 10 to 300 parts by mass of the surface-treated high dielectric inorganic particles (B) are contained based on 100 parts by mass of the thermoplastic resin (A).

8. A high dielectric film for a film capacitor obtained by molding the film forming composition of claim 1.

9. A high dielectric film for a film capacitor, wherein surface-treated high dielectric inorganic particles (B) obtained by treating surfaces of high dielectric inorganic particles (b1) having a dielectric constant (20° C., 1 kHz) of 100 or more with a low dielectric compound (b2) having a dielectric constant (20° C., 1 kHz) of 10 or less are dispersed in a thermoplastic resin (A), said low dielectric compound (b2) being at least one organic compound selected from the group consisting of an organotitanium compound, an organosilane compound, an organozirconium compound, an organoaluminum compound and an organic phosphorus compound, and a blended amount of said low dielectric compound (b2) being 0.1 to 20 parts by mass based on 100 parts by mass of the high dielectric inorganic particles (b1), said organotitanium compound is alkoxy titanium, titanium chelate or titanium acylate, said organosilane compound is monoalkoxysilane, dialkoxysilane, trialkoxysilane, tetraalkoxysilane, vinylsilane, epoxysilane, aminosilane, metachloxysilane or mercaptosilane, said organic zirconium compound is alkoxyzirconium or zirconium chelate, said organoaluminum compound is alkoxyaluminum or aluminum chelate, and said organic phosphorus compound is phosphorous acid ester, phosphoric acid ester or phosphoric acid chelate.

10. A laminated high dielectric film for a film capacitor, comprising an insulating resin layer which is provided on at least one side of the high dielectric film for a film capacitor of claim 8.

11. A film capacitor comprising an electrode layer which is provided on at least one side of the high dielectric film for the film capacitor of claim 8.

12. A laminated high dielectric film for a film capacitor, comprising an insulating resin layer which is provided on at least one side of the high dielectric film for a film capacitor of claim 9.

13. A film capacitor comprising an electrode layer which is provided on at least one side of the high dielectric film for the film capacitor of claim 9.

* * * * *